(12) United States Patent
Liberg et al.

(10) Patent No.: US 12,273,851 B2
(45) Date of Patent: Apr. 8, 2025

(54) GNSS MEASUREMENT GAPS

(71) Applicant: Telefonaktiebolaget LM Ericsson (publ), Stockholm (SE)

(72) Inventors: Olof Liberg, Enskede (SE); Xingqin Lin, San Jose, CA (US); Sebastian Euler, Storvreta (SE); Jonas Sedin, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 390 days.

(21) Appl. No.: 17/776,361

(22) PCT Filed: Dec. 18, 2020

(86) PCT No.: PCT/SE2020/051238
§ 371 (c)(1),
(2) Date: May 12, 2022

(87) PCT Pub. No.: WO2021/133239
PCT Pub. Date: Jul. 1, 2021

(65) Prior Publication Data
US 2022/0417889 A1    Dec. 29, 2022

Related U.S. Application Data

(60) Provisional application No. 62/952,870, filed on Dec. 23, 2019.

(51) Int. Cl.
*H04W 64/00* (2009.01)
*G01S 19/13* (2010.01)
(Continued)

(52) U.S. Cl.
CPC ........... *H04W 64/003* (2013.01); *G01S 19/13* (2013.01); *H04W 24/10* (2013.01); *H04W 36/0058* (2018.08)

(58) Field of Classification Search
CPC ........... H04W 64/003; H04W 36/0058; H04W 24/10; G01S 19/13
See application file for complete search history.

(56) References Cited

U.S. PATENT DOCUMENTS

2008/0189970 A1* 8/2008 Wang ................ H04W 36/0058
33/700
2017/0289952 A1* 10/2017 Muquet ................ G01S 5/0236
(Continued)

FOREIGN PATENT DOCUMENTS

CN     103329604 A    9/2013
CN     105548960 A    5/2016
(Continued)

OTHER PUBLICATIONS

International Search Report and Written Opinion dated Mar. 15, 2021 for International Application No. PCT/SE2020/051238 filed Dec. 18, 2020; consisting of 12 pages.
(Continued)

*Primary Examiner* — Won Tae C Kim
(74) *Attorney, Agent, or Firm* — Sage Patent Group

(57) ABSTRACT

A method, system and apparatus are disclosed. In one or more embodiments, a network node for communicating with a wireless device is provided. The network node includes processing circuitry configured to receive measurement capability information of a wireless device where the measurement capability information indicates an ability to perform a global navigation satellite system, GNSS, measurement. The processing circuitry is further configured to determine a GNSS measurement gap configuration during which the wireless device is to perform at least one GNSS measurement during at least one GNSS measurement gap where the GNSS measurement gap configuration is based at least in part on the received measurement capability information, and indicate the GNSS measurement gap configuration to the wireless device.

22 Claims, 7 Drawing Sheets

(51) Int. Cl.
  *H04W 24/10*   (2009.01)
  *H04W 36/00*   (2009.01)

(56) References Cited

U.S. PATENT DOCUMENTS

2017/0339595 A1    11/2017  Siomina et al.
2021/0367741 A1*   11/2021  Yiu ...................... H04L 5/0007

FOREIGN PATENT DOCUMENTS

| EP | 2664202 B1     | 12/2016 |
| TW | 201235688 A1   | 9/2012  |
| WO | 2017189862 A1  | 11/2017 |
| WO | 2018217323 A1  | 11/2018 |
| WO | 2020162806 A3  | 8/2020  |

OTHER PUBLICATIONS

3GPP TSG RAN meeting #86 RP-193234; Title: Solutions for NR to support non-terrestrial networks (NTN); Source: Thales; Type: WID new; Document for: Approval; Agenda Item: 9.1.2—Proposals led by RAN2; Release Rel-17; Date and Location: Dec. 9-13, 2019, Sitges, Spain; consisting of 10 pages.

3GPP TSG RAN Meeting #86 RP-193235; Title: New Study WID on NB-Io Tie TMC support for NTN; Source: MediaTek Inc.; Document for: Approval; Agenda Item: xxx; Date and Location: Dec. 9-31, 2019, Sitges, Spain; consisting of 5 pages.

3GPP TSG-SA5 Meeting #84 S5-121876; Title: Add mechanism for reduction of redundant MDT data; Source to WG: NEC; Source to TSG: S5; Work Item code: OAM-ePM-UE; Date and Location: Aug. 20-24, 2012, Berlin, Germany; consisting of 6 pages.

3GPP TSG-RAN WG1 Meeting #102-e R1-2005502; Title: On UL time and frequency synchronization enhancements for NTN; Agenda Item: 8.4.2; Source: Ericsson; Document for: Discussion; Date and Location: Aug. 17-28, 2020; e-Meeting; consisting of 13 pages.

3GPP TSG RAN WG1 Meeting #99 R1-1913022; Title: Positioning in NTN; Source: Nokia, Nokia Shanghai Bell; Document for: Discussion and Decision; Agenda Item: 7.2.5.5; Date and Location: Nov. 18-22, 2019, Reno, USA: consisting of 7 pages.

Taiwanese Office Action and English summary dated Jul. 23, 2021 for Application No. 11020708360, consisting of 12 pages.

3GPP TR 38.811 V15.2.0; 3rd Generation Partnership Project; Technical Specification Group Radio Access Network; Study on New Radio (NR) to support non-terrestrial networks (Release 15); Sep. 2019, consisting of 126 pages.

* cited by examiner

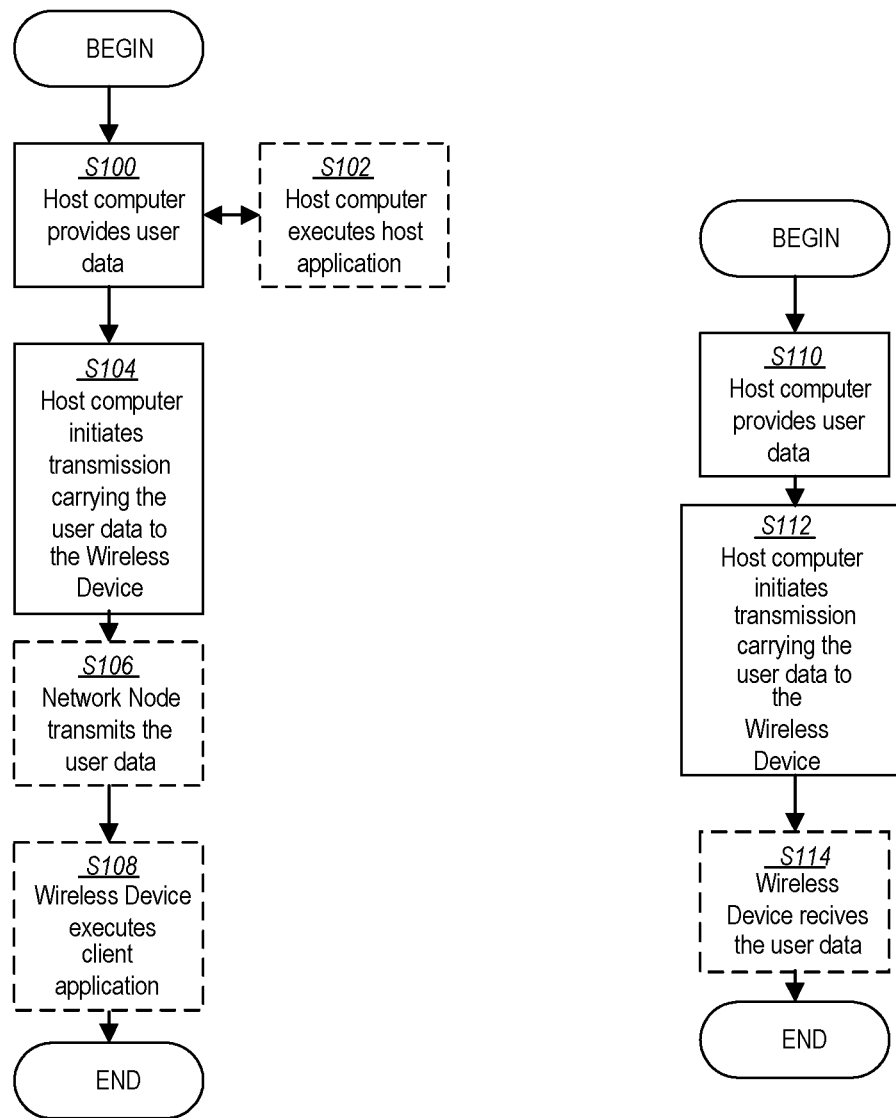

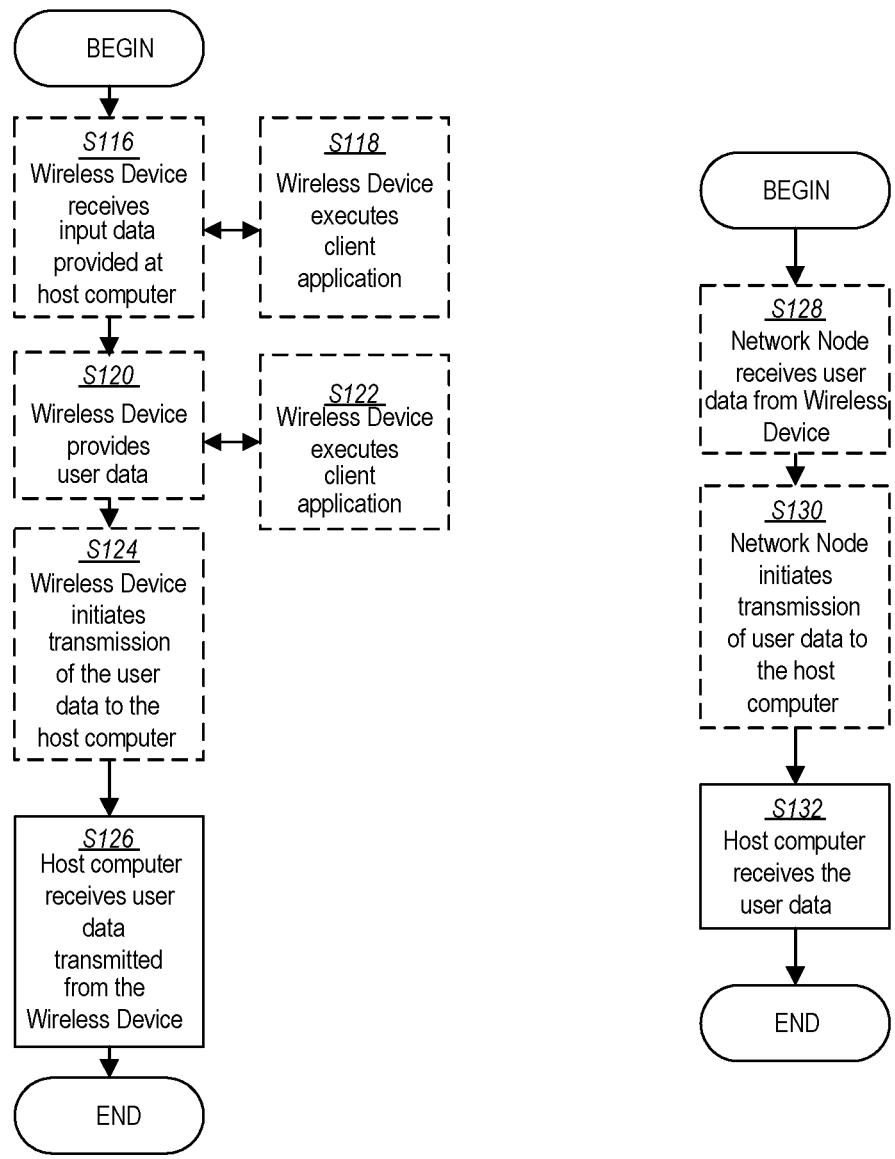

GNSS MEASUREMENT GAPS

CROSS-REFERENCE TO RELATED APPLICATIONS

This application is a Submission Under 35 U.S.C. § 371 for U.S. National Stage Patent Application of International Application No.: PCT/SE2020/051238, filed Dec. 18, 2020 entitled "GNSS MEASUREMENT GAPS," which claims priority to U.S. Provisional Application No. 62/952,870, filed Dec. 23, 2019, entitled "GNSS MEASUREMENT GAPS," the entireties of both of which are incorporated herein by reference.

TECHNICAL FIELD

The present disclosure relates to wireless communications, and in particular, to Global Navigation Satellite System (GNSS) measurement configuration and performance.

BACKGROUND

In Third Generation Partnership Project, 3GPP, Release 8, an Evolved Packet System (EPS) was described. The EPS is based at least in part on the Long-Term Evolution (LTE, also referred to as 4G) radio network and the Evolved Packet Core (EPC). EPS may have been intended to provide voice and mobile broadband (MBB) services but has continuously evolved to add functionality. Since 3GPP Release 13 NB-IoT and LTE-M are part of the LTE specifications and provide connectivity to massive machine type communications (mMTC) services.

In 3GPP Release 15, a release of the $5^{th}$ Generation (5G) system (5GS) was described. This radio access technology may be intended at least in part to serve use cases such as enhanced mobile broadband (eMBB), ultra-reliable and low latency communication (URLLC) and mMTC. 5G includes the New Radio (NR) access stratum interface and the 5G Core Network (5GC). The NR physical and higher layers are reusing parts of the LTE specification/standard, and also define new components for new use cases. One such component is the introduction of a framework for beam forming and beam management to extend the support of the 3GPP technologies to a frequency range going beyond 6 GHz.
Satellite Communications In 3GPP Release 15, 3GPP described preparing NR for operation in a Non-Terrestrial Network (NTN). Research was performed within the study item—NR to support Non-Terrestrial Networks—and resulted in Technical Report (TR) 38.811. In 3GPP Release 16, research to prepare NR for operation in an NTN network continued with the study item—Solutions for NR to support Non-Terrestrial Network. Meanwhile, the interest to adapt NB-IoT and LTE-M for operation in NTN continued to grow. 3GPP Release 17 contains both a work item on NR NTN and a study item on NB-IoT and LTE-M support for NTN.

An example satellite radio access network may include one or more of the following components illustrated in FIG. 1 and/or listed below:
  A satellite that refers to a space-borne platform.
  An earth-based gateway that connects the satellite to a base station or a core network, depending on the network architecture.
  Feeder link that refers to the link between a gateway and a satellite
  Access link that refers to the link between a satellite and a wireless device.

Depending on the orbit altitude, a satellite may be categorized as low earth orbit (LEO), medium earth orbit (MEO), or geostationary earth orbit (GEO) satellite. In general,
  LEO: typical heights ranging from 250-1,500 km, with orbital periods ranging from 90-120 minutes.
  MEO: typical heights ranging from 5,000-25,000 km, with orbital periods ranging from 3-15 hours.
  GEO: height at about 35,786 km, with an orbital period of 24 hours.

A communication satellite may generate several beams over a given area. The footprint of a beam is usually in an elliptic shape, which has been referred to as a cell. The footprint of a beam may be referred to as a spotbeam as shown in FIG. 1, for example. The footprint of a beam may move over the earth's surface with the satellite movement or may be "earth fixed" with some beam pointing mechanism used by the satellite to compensate for its motion, i.e., the footprint may generally remain stationary on earth. The size of a spotbeam depends on the system design but may range from tens of kilometers to a few thousands of kilometers. The architecture in FIG. 1 is an example architecture of a satellite network with "bent pipe" transponders that are known in the art.

Propagation delay is one aspect of satellite communications that is different from the delay expected in a terrestrial mobile system. For a bent pipe satellite network, the round-trip delay may, due at least in part to the orbit height, range from tens of milliseconds (ms) in the case of LEO to several hundreds of ms for GEO. This can be compared to the round-trip delays in a cellular network which may be limited to 1 ms.

The propagation delay may also be highly variable due to the high velocity of the LEO and MEO satellites such that the delay may change in the order of 10 to 100 microseconds (μ) every second, depending on the orbit altitude and satellite velocity.

A second aspect related to the timing is a Doppler frequency offset that is induced by the motion of the satellite. The access link may be exposed to a Doppler shift in the order of 10 to 100 kHz in sub-6 GHz and may be proportionally higher in higher frequencies. Also, the Doppler is varying, with a rate of up to several hundred Hz per second in S band and several kHz per second in Ka band.
GNSS Receiver To handle the timing and frequency synchronization in a NR or LTE based NTN, one technique is to equip each wireless device with a Global Navigation Satellite System (GNSS) receiver which allows a wireless device to estimate its geographical position. In one example, a satellite broadcasts its ephemeris data to a GNSS equipped wireless device. The wireless device may then determine one or more of the propagation delay, the delay variation, the Doppler shift and its variation rate based at least in part on its own location information and the satellite location information.

SUMMARY

Different levels of integration of the GNSS chip in a 3GPP cellular modem of a wireless device are being studied. For example, 3GPP Release 17 has a work item on NR NTN that indicates that the wireless device may support GNSS. However, GNSS may not be supported during RRC connected mode such that the wireless device may not be able to achieve timing and frequency correction while in RRC connected mode. In another example, 3GPP Release 17 may address enhancement such as on the Physical Random Access Channel (PRACH) sequence and/or format and extension of the RA-ResponseWindow duration (in the case of a wireless device with GNSS capability but without pre-compensation of timing and frequency offset capabilities).

A 3GPP Release 17 study item on NB-IoT and LTE M for NTN may address the following indication: GNSS capability in the wireless device is assumed in the study item for both NB-IoT and eMTC devices. With this assumption, the wireless device can estimate and pre-compensate timing and frequency offset with sufficient accuracy for UL transmission. Simultaneous GNSS and NTN NB-IoT/eMTC operation is not assumed and hence is not described nor suggested in the study item.

Therefore, in some of these 3GPP discussions a wireless device may share parts of its radio frequency (RF) architecture between the cellular modem and the GNSS chip. An example for making use of these 3GPP discussions is to make use of the same antenna for receiving the GNSS reference signal and for receiving and transmitting an LTE or NR signal. A switch may be used to switch the antenna to the cellular RF frontend or the GNSS RF frontend. The switch provides needed isolation between the cellular transmitter and the GNSS receiver but does also prevent simultaneous GNSS and cellular operation.

3GPP has identified GNSS as a mechanism to manage the time and frequency ambiguities in an NTN, but 3GPP has not discussed when and how a wireless device may be able to perform the GNSS measurements. One example mechanism aims to provide a basic set of rules for when a wireless device is to perform GNSS measurements, but this mechanism assumes a wireless device architecture where a GNSS capable wireless device can perform simultaneous GNSS and cellular operation. Such an architecture may be viable, e.g., if the switch is replaced by a more costly and complex duplex filter. In a wireless device architecture where simultaneous operation is not supported, it may not be enough to only specify the GNSS measurement behavior as the mechanism may also impact the cellular operation.

The instant disclosure solves at least a portion of the problems with existing discussions and/or mechanisms by providing one or more restrictions on the cellular operation of a wireless device for facilitating GNSS measurements. One advantage provided by the teachings of the disclosure is that the teachings support and/or provide GNSS measurements for a wireless device in radio resource control (RRC) Connected operation for e.g., facilitating continuous GNSS based time and frequency corrections in an NTN.

Some embodiments advantageously provide methods, systems, and apparatuses for GNSS measurement configuration and performance.

According to one aspect of the disclosure, a network node for communicating with a wireless device is provided. The network node includes processing circuitry configured to receive measurement capability information of a wireless device where the measurement capability information indicates an ability to perform a global navigation satellite system, GNSS, measurement. The processing circuitry is further configured to determine a GNSS measurement gap configuration during which the wireless device is to perform at least one GNSS measurement during at least one GNSS measurement gap where the GNSS measurement gap configuration is based at least in part on the received measurement capability information, and indicate the GNSS measurement gap configuration to the wireless device.

According to one or more embodiments of this aspect, the GNSS measurement gap configuration configures the wireless device that is in a radio resource control, RRC, connected state with at least one transmission gap during which a GNSS measurement is to be performed. According to one or more embodiments of this aspect, the at least one transmission gap is configured based on a scheduled transmission of the wireless device exceeding a predefined time length. According to one or more embodiments of this aspect, the at least one GNSS measurement gap is associated with at least one of a trigger, gap length, periodicity and offset.

According to one or more embodiments of this aspect, the trigger is based on a predefined event and corresponds to one of a predefined instruction transmitted by the network node and predefined condition being satisfied. According to one or more embodiments of this aspect, the predefined event is a handover event. According to one or more embodiments of this aspect, the predefined instruction is a handover command where the predefined condition is a handover of the wireless device. According to one or more embodiments of this aspect, the processing circuitry is further configured to determine a time length of a GNSS measurement gap of the at least one GNSS measurement gap based on at least one of a number of GNSS satellites, a quality of a GNSS receiver at the wireless device and an indicated failure to receive a GNSS position.

According to one or more embodiments of this aspect, the number of GNSS satellites corresponds to a minimum number of GNSS satellites to achieve a predefined precision of GNSS measurement. According to one or more embodiments of this aspect, the processing circuitry is further configured to receive a report indicating a time for the wireless device to perform the at least one GNSS measurement, and change a GNSS measurement gap configuration of the wireless device based at least on the report. According to one or more embodiments of this aspect, the network node does not schedule the wireless device to at least one of receive and transmit via a cellular radio interface during the at least one GNSS measurement gap. According to one or more embodiments of this aspect, the at least one GNSS measurement is configured to allow the wireless device to acquire location information for correcting at least one of time and frequency references used for cellular radio communication.

According to another aspect of the disclosure, a wireless device for communicating with a network node is provided. The wireless device includes processing circuitry configured to transmit measurement capability information indicating an ability to perform a global navigation satellite system, GNSS, measurement. The processing circuitry is further configured to receive an indication of a GNSS measurement gap configuration during which the wireless device is to perform at least one GNSS measurement during at least one GNSS measurement gap where the GNSS measurement gap configuration is based at least in part on the received measurement capability information, and perform the at least one GNSS measurement.

According to one or more embodiments of this aspect, the GNSS measurement gap configuration configures the wireless device that is in a radio resource control, RRC, connected state with at least one transmission gap during which a GNSS measurement is configured to be performed. According to one or more embodiments of this aspect, the at least one transmission gap is configured based on a scheduled transmission of the wireless device exceeding a predefined time length. According to one or more embodiments of this aspect, the at least one GNSS measurement gap is associated with at least one of a trigger, gap length, periodicity and offset.

According to one or more embodiments of this aspect, the trigger is based on a predefined event and corresponds to one of a predefined instruction transmitted by the network node and predefined condition being satisfied. According to one or more embodiments of this aspect, the predefined event is a handover event. According to one or more embodiments of this aspect, the predefined instruction is a handover command where the predefined condition is a handover of the wireless device.

According to one or more embodiments of this aspect, a time length of a GNSS measurement gap of the at least one GNSS measurement gap is based on at least one of a number of GNSS satellites, a quality of a GNSS receiver at the wireless device and an indicated failure to receive a GNSS position. According to one or more embodiments of this aspect, the number of GNSS satellites corresponds to a minimum number of GNSS satellites to achieve a predefined precision of GNSS measurement. According to one or more embodiments of this aspect, the processing circuitry is further configured to transmit a report indicating a time for the wireless device to perform the at least one GNSS measurement, and receive an indication of a change in the GNSS measurement gap configuration of the wireless device based at least on the report.

According to one or more embodiments of this aspect, the wireless device is not required to at least one of receive and transmit via a cellular radio interface during the at least one GNSS measurement gap. According to one or more embodiments of this aspect, the processing circuitry is further configured to acquire location information for correcting at least one of time and frequency references used for cellular radio communication using the at least one GNSS measurement.

According to another aspect of the disclosure, a method performed by a network node that is configured to communicate with a wireless device is provided. Measurement capability information of a wireless device is received where the measurement capability information indicates an ability to perform a global navigation satellite system, GNSS, measurement. A GNSS measurement gap configuration during which the wireless device is to perform at least one GNSS measurement during at least one GNSS measurement gap is determined where the GNSS measurement gap configuration is based at least in part on the received measurement capability information. The GNSS measurement gap configuration is indicated to the wireless device.

According to one or more embodiments of this aspect, the GNSS measurement gap configuration configures the wireless device that is in a radio resource control, RRC, connected state with at least one transmission gap during which a GNSS measurement is to be performed. According to one or more embodiments of this aspect, the at least one transmission gap is configured based on a scheduled transmission of the wireless device exceeding a predefined time length. According to one or more embodiments of this aspect, the at least one GNSS measurement gap is associated with at least one of a trigger, gap length, periodicity and offset.

According to one or more embodiments of this aspect, the trigger is based on a predefined event and corresponds to one of a predefined instruction transmitted by the network node and predefined condition being satisfied. According to one or more embodiments of this aspect, the predefined event is a handover event. According to one or more embodiments of this aspect, the predefined instruction is a handover command where the predefined condition is a handover of the wireless device.

According to one or more embodiments of this aspect, a time length of a GNSS measurement gap of the at least one GNSS measurement gap is determined based on at least one of a number of GNSS satellites, a quality of a GNSS receiver at the wireless device and an indicated failure to receive a GNSS position. According to one or more embodiments of this aspect, the number of GNSS satellites corresponds to a minimum number of GNSS satellites to achieve a predefined precision of GNSS measurement. According to one or more embodiments of this aspect, a report indicating a time for the wireless device to perform the at least one GNSS measurement is received. A GNSS measurement gap configuration of the wireless device is changed based at least on the report.

According to one or more embodiments of this aspect, the network node does not schedule the wireless device to at least one of receive and transmit via a cellular radio interface during the at least one GNSS measurement gap. According to one or more embodiments of this aspect, the at least one GNSS measurement is configured to allow the wireless device to acquire location information for correcting at least one of time and frequency references used for cellular radio communication.

According to another aspect of the disclosure, a method performed by a wireless device that is configured to communicate with a network node is provided. Measurement capability information indicating an ability to perform a global navigation satellite system, GNSS, measurement is transmitted. An indication of a GNSS measurement gap configuration during which the wireless device is to perform at least one GNSS measurement during at least one GNSS measurement gap is received where the GNSS measurement gap configuration is based at least in part on the received measurement capability information. The at least one GNSS measurement is performed.

According to one or more embodiments of this aspect, the GNSS measurement gap configuration configures the wireless device that is in a radio resource control, RRC, connected state with at least one transmission gap during which a GNSS measurement is configured to be performed. According to one or more embodiments of this aspect, the at least one transmission gap is configured based on a scheduled transmission of the wireless device exceeding a predefined time length. According to one or more embodiments of this aspect, the at least one GNSS measurement gap is associated with at least one of a trigger, gap length, periodicity and offset.

According to one or more embodiments of this aspect, the trigger is based on a predefined event and corresponds to one of a predefined instruction transmitted by the network node and predefined condition being satisfied. According to one or more embodiments of this aspect, the predefined event is a handover event. According to one or more embodiments of this aspect, the predefined instruction is a handover command where the predefined condition is a handover of the wireless device.

According to one or more embodiments of this aspect, a time length of a GNSS measurement gap of the at least one GNSS measurement gap is based on at least one of a number of GNSS satellites, a quality of a GNSS receiver at the wireless device and an indicated failure to receive a GNSS position. According to one or more embodiments of this aspect, the number of GNSS satellites corresponds to a minimum number of GNSS satellites to achieve a predefined precision of GNSS measurement. According to one or more embodiments of this aspect, a report indicating a time for the wireless device to perform the at least one GNSS measurement is transmitted. An indication of a change in the GNSS measurement gap configuration of the wireless device based at least on the report is received.

According to one or more embodiments of this aspect, the wireless device is not required to at least one of receive and transmit via a cellular radio interface during the at least one GNSS measurement gap. According to one or more embodiments of this aspect, location information for correcting at least one of time and frequency references used for cellular radio communication using the at least one GNSS measurement is acquired.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating example methods implemented in a communication system including a host computer, a network node and a wireless device for executing a client application at a wireless device according to some embodiments of the present disclosure;

FIG. 5 is a flowchart illustrating example methods implemented in a communication system including a host computer, a network node and a wireless device for receiving user data at a wireless device according to some embodiments of the present disclosure;

FIG. 6 is a flowchart illustrating example methods implemented in a communication system including a host computer, a network node and a wireless device for receiving user data from the wireless device at a host computer according to some embodiments of the present disclosure;

FIG. 7 is a flowchart illustrating example methods implemented in a communication system including a host computer, a network node and a wireless device for receiving user data at a host computer according to some embodiments of the present disclosure;

DETAILED DESCRIPTION

Figure 1:
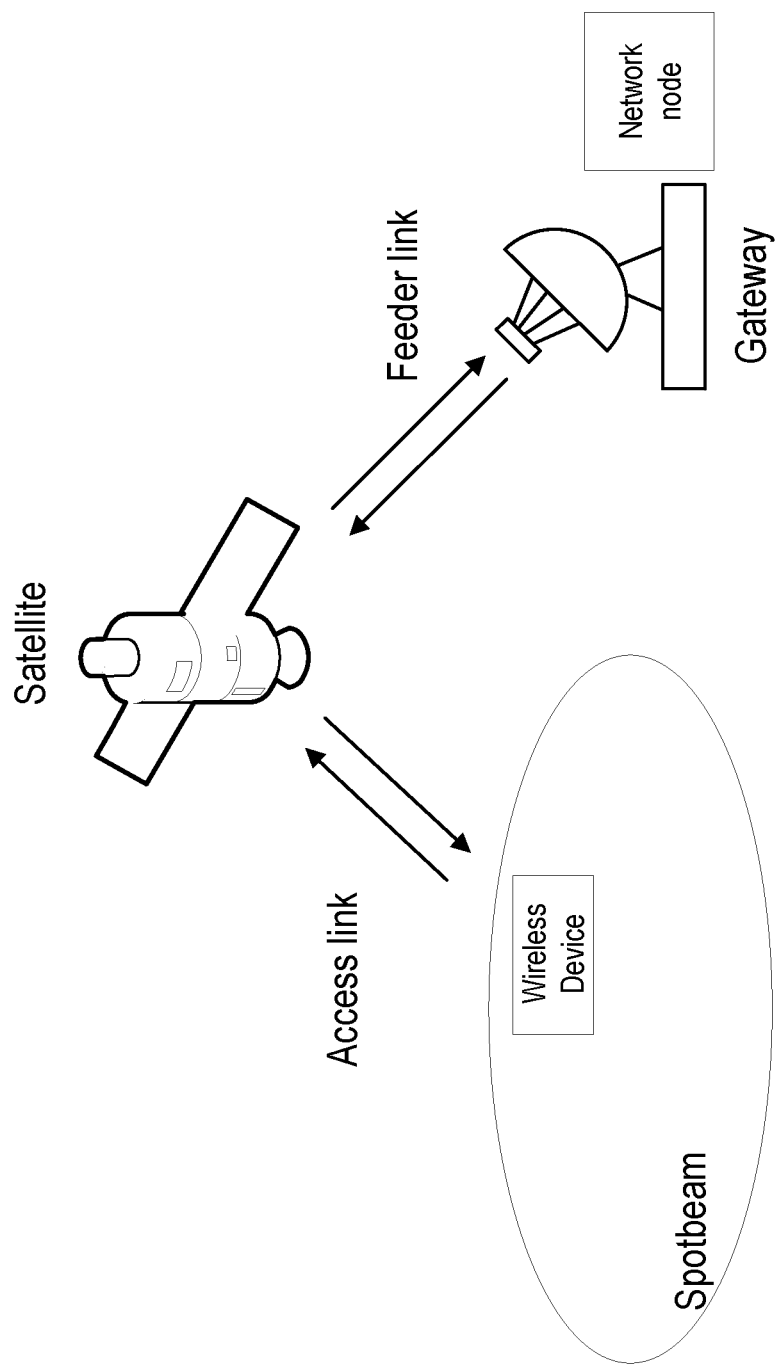
FIG. 1 is an example architecture of an example satellite network with bent pipe transponders.

Before describing in detail exemplary embodiments, it is noted that the embodiments reside primarily in combinations of apparatus components and processing steps related to GNSS measurement configuration and performance. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode and/or characteristics related to GNSS measurements as described herein. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide GNSS measurement configuration and performance.

Figure 2:
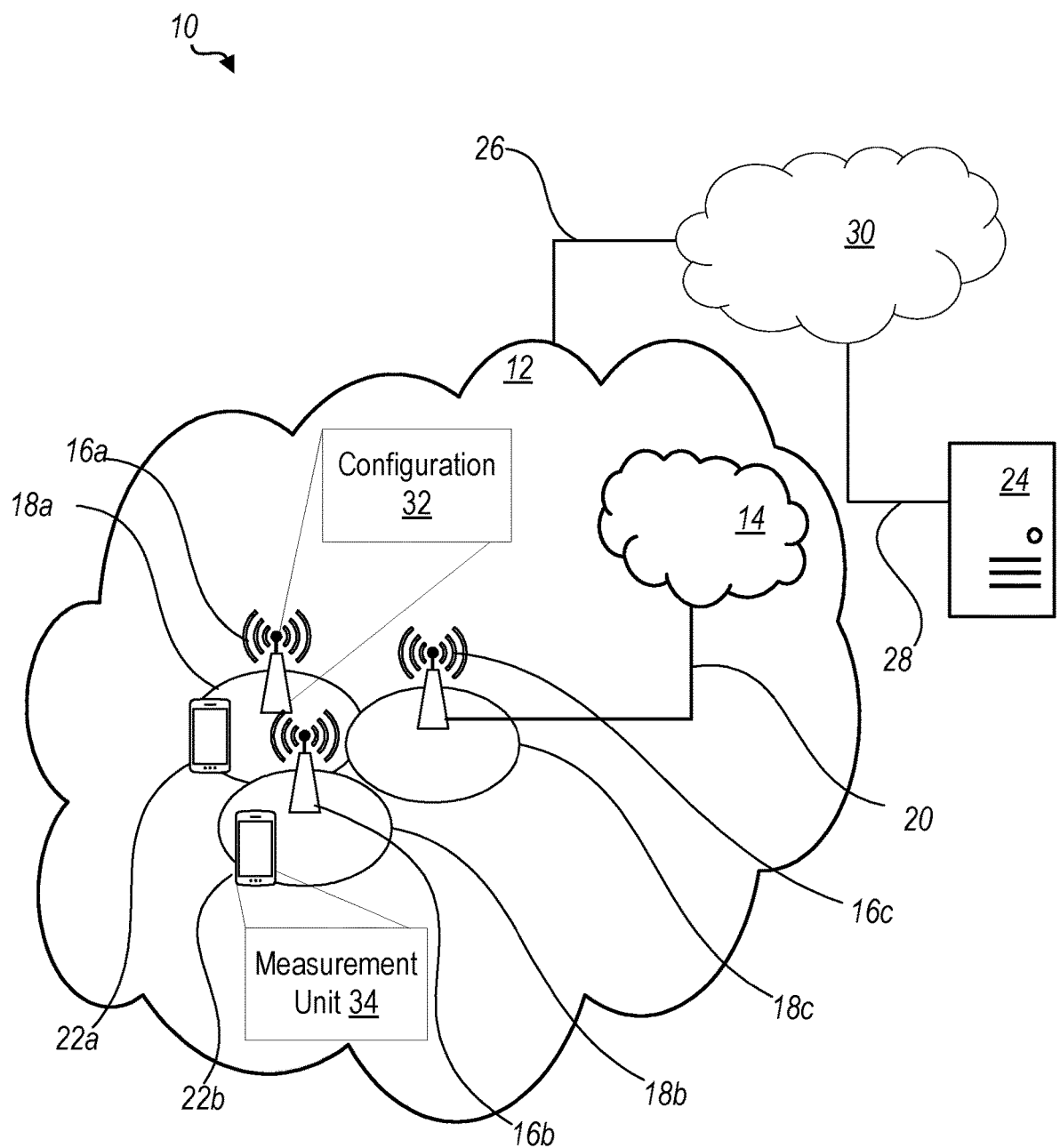
FIG. 2 is a schematic diagram of an exemplary network architecture illustrating a communication system connected via an intermediate network to a host computer according to the principles in the present disclosure.

Referring now to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to perform one or more network node 16 functions as described herein such as with respect to GNSS measurement configuration and performance. A wireless device 22 is configured to include a measurement unit 34 which is configured to perform one or more wireless device 22 functions as described herein such as with respect to GNSS measurement configuration and performance.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of process, determine, store, forward, relay, transmit, receive, communicate, indication, etc., information related to GNSS measurement configuration and performance that is described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform one or more network node 16 functions described herein such as with respect to GNSS measurement configuration and performance.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a measurement unit 34 configured to perform one or more wireless device 22 functions such as with respect to GNSS measurement configuration and performance as described herein.

Figure 3:
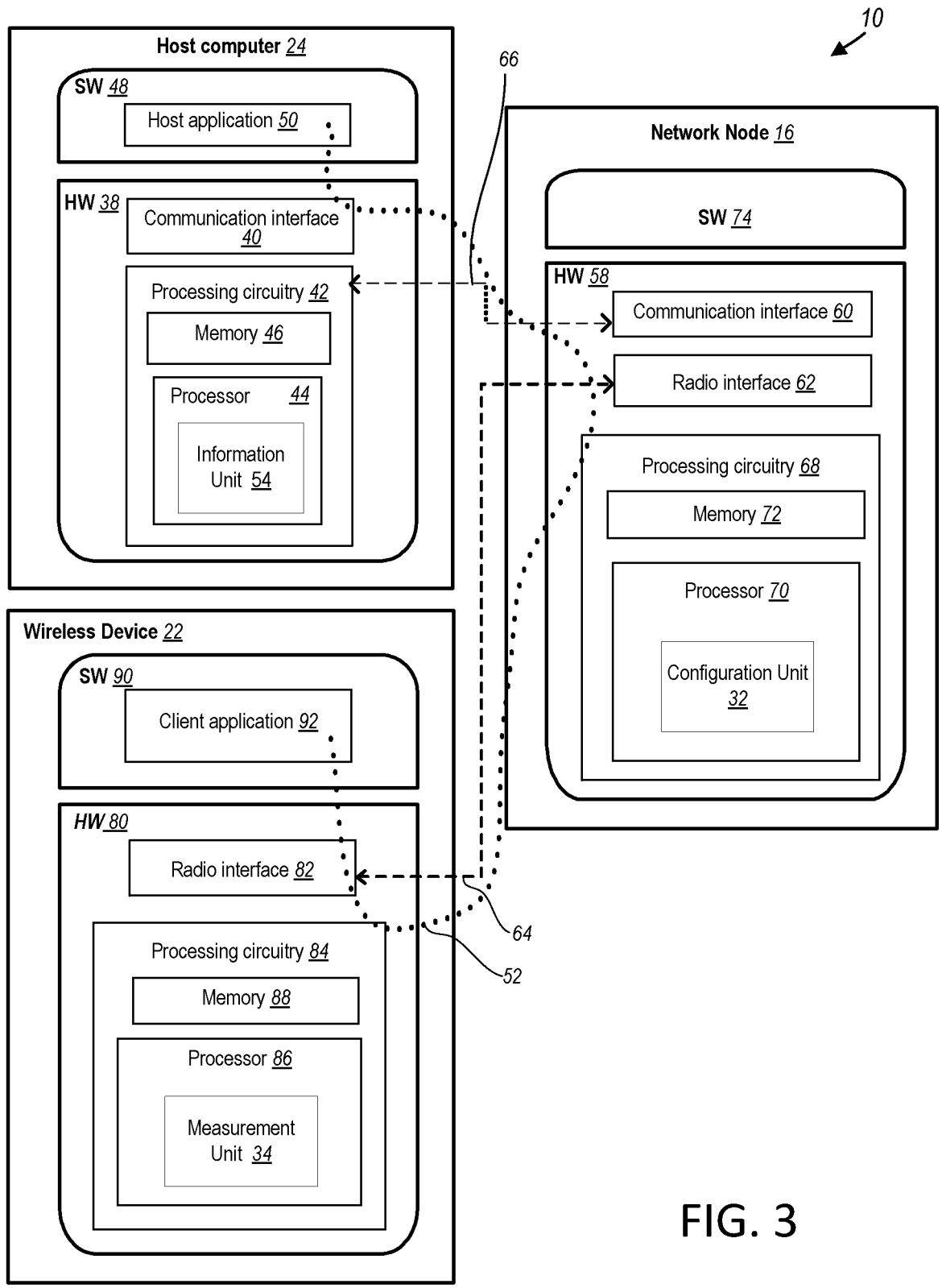
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as configuration unit 32, and measurement unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an example method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an example method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
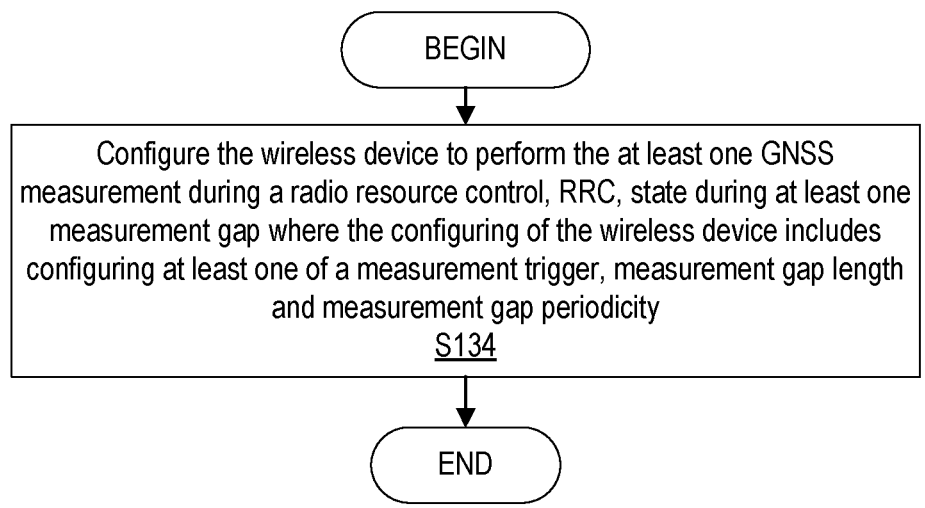
FIG. 8 is a flowchart of an example process in a network node according to some embodiments of the present disclosure.

FIG. 8 is a flowchart of an example process in a network node 16 according to one or more embodiments of the disclosure. One or more Blocks and/or functions performed by network node 16 may be performed by one or more elements of network node 16 such as by configuration unit 32 in processing circuitry 68, processor 70, radio interface 62, communication interface 60, etc. In one or more embodiments, network node 16 such as via one or more of processing circuitry 68, processor 70, configuration unit 32, communication interface 60 and radio interface 62 is configured to configure (Block S134) the wireless device 22 to perform the at least one GNSS measurement during a radio resource control, RRC, state during at least one measurement gap where the configuring of the wireless device 22 includes configuring at least one of a measurement trigger, measurement gap length and measurement gap periodicity, as described herein.

According to one or more embodiments of the disclosure, the network node 16 and/or radio interface 62 and/or processing circuitry 68 is further configured to receive an indication of the at least one GNSS measurement trigger for performing the at least one GNSS measurement by the wireless device in the RRC state during the at least one measurement gap, as described herein. According to one or more embodiments, the measurement trigger includes at least one of an absolute time and trigger event condition. According to one or more embodiments, the network node 16 and/or radio interface 62 and/or processing circuitry 68 is further configured to receive capability information of the wireless device 22 for performing the at least one GNSS measurement where the capability information including at least one of frequency division duplex (FDD) capability, time division duplex (TDD) capability and frequency band capability. In some embodiments, the configuration of the wireless device 22 is based at least in part on the wireless device capability information.

Figure 9:
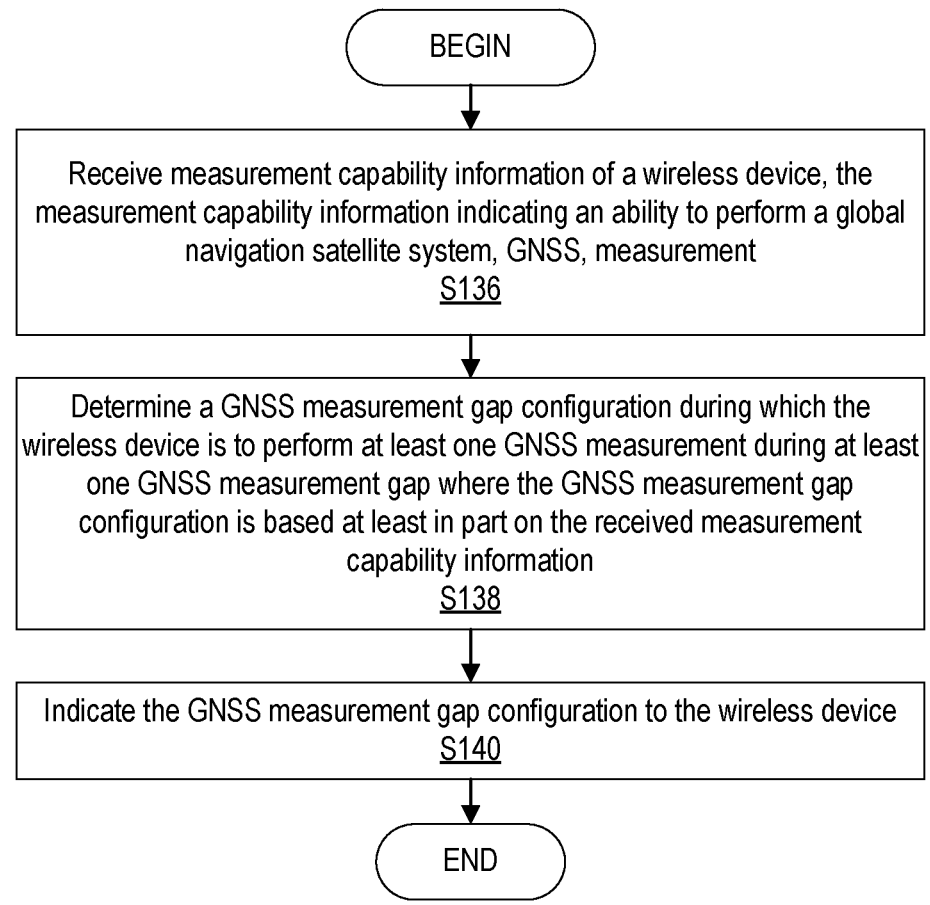
FIG. 9 is a flowchart of another example process in a network node according to some embodiments of the present disclosure.

FIG. 9 is a flowchart of another example process in a network node 16 according to one or more embodiments of the disclosure. One or more Blocks and/or functions performed by network node 16 may be performed by one or more elements of network node 16 such as by configuration unit 32 in processing circuitry 68, processor 70, radio interface 62, communication interface 60, etc. In one or more embodiments, network node 16 such as via one or more of processing circuitry 68, processor 70, configuration unit 32, communication interface 60 and radio interface 62 is configured to receive (Block S136) measurement capability information of a wireless device 22 where the measurement capability information indicates an ability to perform a global navigation satellite system, GNSS, measurement, as described herein.

In one or more embodiments, network node 16 such as via one or more of processing circuitry 68, processor 70, configuration unit 32, communication interface 60 and radio interface 62 is configured to determine (Block S138) a GNSS measurement gap configuration during which the wireless device 22 is to perform at least one GNSS measurement during at least one GNSS measurement gap where the GNSS measurement gap configuration is based at least in part on the received measurement capability information, as described herein. In one or more embodiments, network node 16 such as via one or more of processing circuitry 68, processor 70, configuration unit 32, communication interface 60 and radio interface 62 is configured to indicate (Block S140) the GNSS measurement gap configuration to the wireless device 22, as described herein.

According to one or more embodiments, the GNSS measurement gap configuration configures the wireless device 22 that is in a radio resource control, RRC, connected state with at least one transmission gap during which a GNSS measurement is to be performed. According to one or more embodiments, the at least one transmission gap is configured based on a scheduled transmission of the wireless device 22 exceeding a predefined time length. According to one or more embodiments, the at least one GNSS measurement gap is associated with at least one of a trigger, gap length, periodicity and offset.

According to one or more embodiments, the trigger is based on a predefined event and corresponds to one of a predefined instruction transmitted by the network node 16 and predefined condition being satisfied. According to one or more embodiments, the predefined event is a handover event. According to one or more embodiments, the predefined instruction is a handover command, and the predefined condition is a handover of the wireless device 22.

According to one or more embodiments, the processing circuitry is further configured to determine a time length of a GNSS measurement gap of the at least one GNSS measurement gap based on at least one of a number of GNSS satellites, a quality of a GNSS receiver at the wireless device and an indicated failure to receive a GNSS position. According to one or more embodiments, the number of GNSS satellites corresponds to a minimum number of GNSS satellites to achieve a predefined precision of GNSS measurement. According to one or more embodiments, the processing circuitry is further configured to receive a report indicating a time for the wireless device to perform the at least one GNSS measurement, and change a GNSS measurement gap configuration of the wireless device based at least on the report.

According to one or more embodiments, the network node 16 does not schedule the wireless device 22 to at least one of receive and transmit via a cellular radio interface during the at least one GNSS measurement gap. According to one or more embodiments, the at least one GNSS measurement is configured to allow the wireless device 22 to acquire location information for correcting at least one of time and frequency references used for cellular radio communication.

Figure 10:
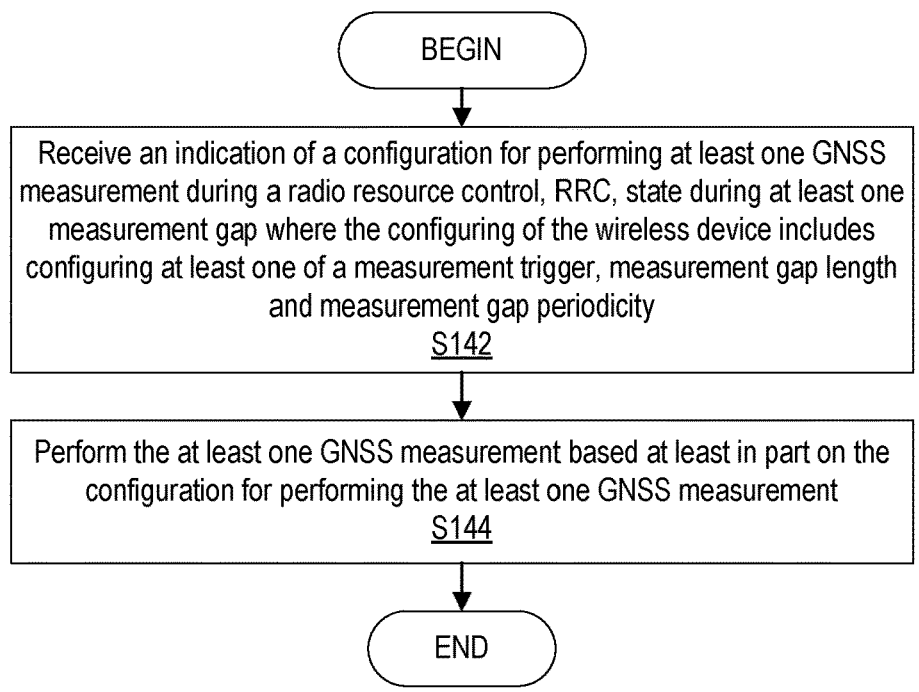
FIG. 10 is a flowchart of an example process in a wireless device according to some embodiments of the present disclosure.

FIG. 10 is a flowchart of an exemplary process in a wireless device 22 according to one or more embodiments of the disclosure. One or more Blocks and/or functions performed by wireless device 22 may be performed by one or more elements of wireless device 22 such as by measurement unit 34 in processing circuitry 84, processor 86, radio interface 82, etc. In one or more embodiments, wireless device 22 such as via one or more of processing circuitry 84, processor 86, measurement unit 34 and radio interface 82 is configured to receive (Block S142) an indication of a configuration for performing at least one GNSS measurement during a radio resource control, RRC, state during at least one measurement gap where the configuring of the wireless device 22 includes configuring at least one of a measurement trigger, measurement gap length and measurement gap periodicity. In one or more embodiments, wireless device 22 such as via one or more of processing circuitry 84, processor 86, measurement unit 34 and radio interface 82 is configured to perform (Block S144) the at least one GNSS measurement based at least in part on the configuration for performing the at least one GNSS measurement.

According to one or more embodiments, the wireless device 22 and/or radio interface 82 and/or processing circuitry 84 is further configured to transmit an indication of the at least one GNSS measurement trigger for performing the at least one GNSS measurement by the wireless device in the RRC state during the at least one measurement gap, as described herein. According to one or more embodiments, the measurement trigger includes at least one of an absolute time and trigger event condition. According to one or more embodiments, the wireless device 22 and/or radio interface 82 and/or processing circuitry 84 is further configured to transmit capability information of the wireless device 22 for performing the at least one GNSS measurement where the capability information includes at least one of frequency division duplex (FDD) capability, time division duplex (TDD) capability and frequency band capability. In some embodiments, the configuration for performing the at least one GNSS measurement is based at least in part on the wireless device capability information.

Figure 11:
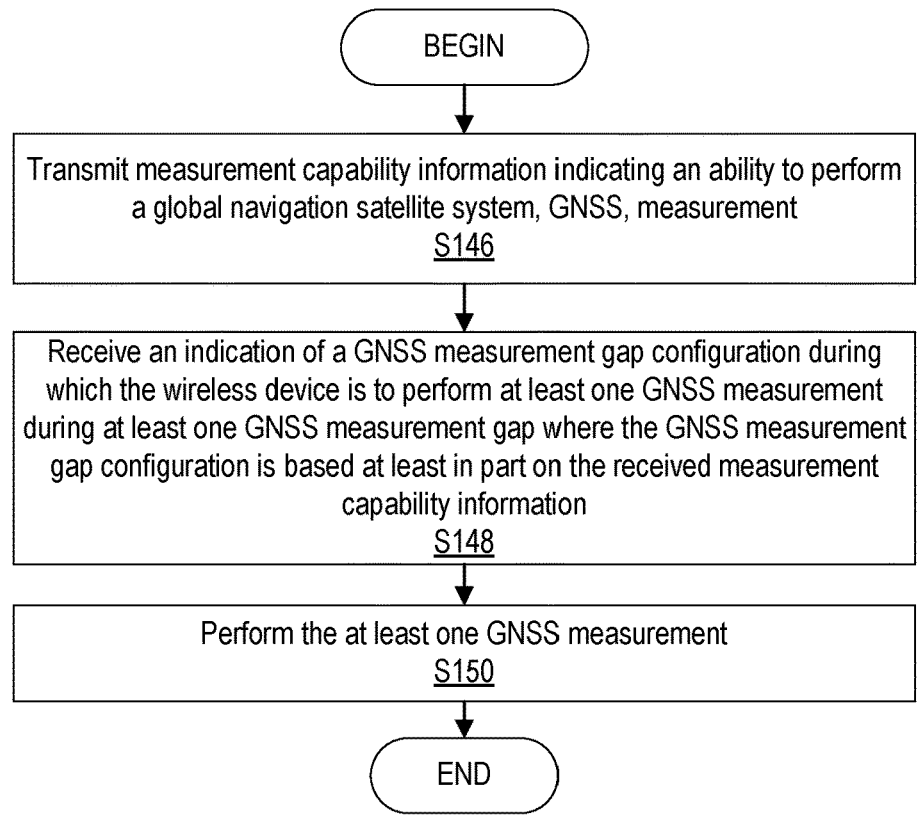
FIG. 11 is a flowchart of another example process in a wireless device according to some embodiments of the present disclosure.

FIG. 11 is a flowchart of another example process in a wireless device 22 according to one or more embodiments of the disclosure. One or more Blocks and/or functions performed by wireless device 22 may be performed by one or more elements of wireless device 22 such as by measurement unit 34 in processing circuitry 84, processor 86, radio interface 82, etc. In one or more embodiments, wireless device 22 such as via one or more of processing circuitry 84, processor 86, measurement unit 34 and radio interface 82 is configured to transmit (Block S146) measurement capability information indicating an ability to perform a global navigation satellite system, GNSS, measurement, as described herein.

In one or more embodiments, wireless device 22 such as via one or more of processing circuitry 84, processor 86, measurement unit 34 and radio interface 82 is configured to receive (Block S148) an indication of a GNSS measurement gap configuration during which the wireless device 22 is to perform at least one GNSS measurement during at least one GNSS measurement gap where the GNSS measurement gap configuration is based at least in part on the received measurement capability information, as described herein. In one or more embodiments, wireless device 22 such as via one or more of processing circuitry 84, processor 86, measurement unit 34 and radio interface 82 is configured to perform (Block S150) the at least one GNSS measurement, as described herein.

According to one or more embodiments, the GNSS measurement gap configuration configures the wireless device 22 that is in a radio resource control, RRC, connected state with at least one transmission gap during which a GNSS measurement is configured to be performed. According to one or more embodiments, the at least one transmission gap is configured based on a scheduled transmission of the wireless device 22 exceeding a predefined time length. According to one or more embodiments, the at least one GNSS measurement gap is associated with at least one of a trigger, gap length, periodicity and offset.

According to one or more embodiments, the trigger is based on a predefined event and corresponds to one of a predefined instruction transmitted by the network node 16 and predefined condition being satisfied. According to one or more embodiments, the predefined event is a handover event. According to one or more embodiments, the predefined instruction is a handover command where the predefined condition is a handover of the wireless device 22.

According to one or more embodiments, a time length of a GNSS measurement gap of the at least one GNSS measurement gap is based on at least one of a number of GNSS satellites, a quality of a GNSS receiver at the wireless device 22 and an indicated failure to receive a GNSS position. According to one or more embodiments, the number of GNSS satellites corresponds to a minimum number of GNSS satellites to achieve a predefined precision of GNSS measurement. According to one or more embodiments, the processing circuitry is further configured to transmit a report indicating a time for the wireless device 22 to perform the at least one GNSS measurement, and receive an indication of a change in the GNSS measurement gap configuration of the wireless device 22 based at least on the report.

According to one or more embodiments, the wireless device 22 is not required to at least one of receive and transmit via a cellular radio interface during the at least one GNSS measurement gap. According to one or more embodiments, the processing circuitry 84 is further configured to acquire location information for correcting at least one of time and frequency references used for cellular radio communication using the at least one GNSS measurement.

Having generally described arrangements for GNSS measurement gap configuration and performance, details for these arrangements, functions and processes are provided as follows, and which may be implemented by the network node 16, wireless device 22 and/or host computer 24.

Embodiments generally relate to GNSS measurement gap configuration and performance, as described below.

Capabilities (e.g., Measurement Capability)

In one or more embodiments, a wireless device 22 such as via one or more of processing circuitry 84, processor 86, radio interface 82, measurement unit 34, etc. signals its capability (e.g., measurement capability information) to perform GNSS measurements. Examples of different capability levels are the support for GNSS measurements in radio resource control (RRC) Idle, in RRC Inactive and/or In RRC Connected states. In RRC Connected state, the wireless device such as via one or more of processing circuitry 84, processor 86, radio interface 82, measurement unit 34, etc. may support GNSS measurements in parallel to cellular operation, and/or during configured measurement gaps, and/or during transmission gaps may correspond to a second level of capabilities. Another example of different capability levels is GNSS time to fix, i.e., the time that may be required by the wireless device 22 to determine its position.

One example of cellular operation is the reception of signals used for Radio Resource Management (RRM) measurement. In one embodiment, a wireless device such as via one or more of processing circuitry 84, processor 86, radio interface 82, measurement unit 34, etc., signals its capabilities of simultaneous GNSS measurements and non-GNSS, e.g., cellular, RRM measurements.

In one or more embodiments, the support of GNSS measurements in relation to pre-compensation of cellular, e.g., LTE or NR, timing, or pre-compensation of frequency offset, or both may correspond to another set of capabilities.

In one or more embodiments, a wireless device 22 such as via one or more of processing circuitry 84, processor 86, radio interface 82, measurement unit 34, etc. signals its GNSS measurement capabilities to the network/network node 16, to allow the network/network node 16 to make use of at least part of this information and to configure the wireless device 22 to network node interface during RRC Connected state.

The GNSS measurement capabilities may be reported per wireless device 22, per band, per band combination, or per band in a band combination. A wireless device 22 such as via one or more of processing circuitry 84, processor 86, radio interface 82, measurement unit 34, etc., may signal the GNSS measurement capabilities (e.g., measurement capability information) for FDD and TDD, separately. A wireless device such as via one or more of processing circuitry 84, processor 86, radio interface 82, measurement unit 34, etc., may also signal the GNSS measurement capabilities (e.g., measurement capability information) separately for different frequency ranges (such as frequency range 1 and frequency range 2).

Measurement Gaps

In one or more embodiments, the network node 16 such as via one or more of processing circuitry 68, processor 70, radio interface 62, configuration unit 32, etc., configures a wireless device 22 in RRC Connected state with GNSS measurement gaps. These gaps may be defined by one or more of a starting trigger, a length, a periodicity and a starting offset determined relative to the start of each period.

The starting trigger may correspond to an absolute time, or a trigger condition. The network node 16 such as via one or more of processing circuitry 68, processor 70, radio interface 62, configuration unit 32, etc., may also choose to configure a single measurement gap to support a single GNSS measurement, i.e., determine a GNSS measurement gap configuration. The network node 16 such as via one or more of processing circuitry 68, processor 70, radio interface 62, configuration unit 32, etc. may use the capability information signaled by the wireless device 22 when determining the configuration of the gaps, i.e., when determining a GNSS measurement gap configuration.

In one or more embodiments, the network node 16 such as via one or more of processing circuitry 68, processor 70, radio interface 62, configuration unit 32, etc., configures a wireless device 22 in RRC Connected with GNSS measurement gaps shared with non-GNSS RRM measurements. The split of the gaps for GNSS and non-GNSS measurements for sharing may be defined by a fraction of the gap, which may be configured by the network node 16 such as via one or more of processing circuitry 68, processor 70, radio interface 62, configuration unit 32, etc.

The wireless device such as via one or more of processing circuitry 84, processor 86, radio interface 82, measurement unit 34, etc. may be configured to perform GNSS measurements during these gaps and may not be required to monitor the cellular radio interface, e.g., for downlink control channel reception. The wireless device 22 such as via one or more of processing circuitry 84, processor 86, radio interface 82, measurement unit 34, etc., may be configured to use the acquired location information for correcting its time and frequency references used for cellular reception and transmission.

Transmissions Gaps

In one or more embodiments, the network node 16 such as via one or more of processing circuitry 68, processor 70, radio interface 62, configuration unit 32, etc., configures a wireless device 22 in RRC Connected state with transmission gaps during which GNSS measurement may be performed, which may be part of the GNSS measurement gap configuration. These transmission gaps may only be applied, in one or more embodiments, for wireless device 22 transmissions exceeding a certain length, and may be defined by one or more of a length, a periodicity and a starting offset determined relative to the start of each period.

The wireless device 22 may be expected to use the acquired location information for correcting its time and frequency references used for reception and transmission. For example, in one or more embodiments, the acquired location information is used to correction, modify and/or change the wireless device 22's time reference(s) and/or frequency reference (s) that are used to receive and/or transmit at the wireless device 22.

In one or more embodiments described herein, a GNSS measurement gap configuration may define at least one of: at least one GNSS measurement gap and at least one transmission gap.

Gaps for Event-Based GNSS Measurements

One or more embodiments described in the Measurement Gaps section and/or the Transmission Gaps section may be configured to provide periodic GNSS measurements, as defined by a GNSS measurement gap configuration, performed by the wireless device 22 such as via one or more of processing circuitry 84, processor 86, radio interface 82, measurement unit 34, etc. In one or more embodiments, measurements such as via one or more of processing circuitry 84, processor 86, radio interface 82, measurement unit 34, etc., may be configured to be triggered by an instruction from the network node 16, e.g., a handover command where the instruction or trigger to perform measurements may be explicit and/or implicit in the instruction. For example, in one or more embodiments, if the wireless device 22 such as via one or more of processing circuitry 84, processor 86, radio interface 82, measurement unit 34, etc. has earlier signaled that the wireless device 22 may not be able to perform GNSS measurements in parallel to cellular operation, the network node 16 such as via one or more of processing circuitry 68, processor 70, radio interface 62, configuration unit 32, etc. may configure the wireless device 22 with a single GNSS measurement gap, defined by one or more of a length and a starting offset relative to the other instruction triggering the GNSS measurement.

Alternatively, the network node 16 such as via one or more of processing circuitry 68, processor 70, radio interface 62, configuration unit 32, etc., may have preconfigured the wireless device 22 with a single measurement gap, i.e., preconfigured with a GNSS measurement gap configuration, to be executed when another instruction triggers a GNSS measurement. The network node 16 such as via one or more of processing circuitry 68, processor 70, radio interface 62, configuration unit 32, etc., may then take this into account when scheduling transmissions for this wireless device 22.

The event that triggers the GNSS measurement at the wireless device 22 may also occur without the possibility for the network node 16 to know about the trigger, e.g., when the condition for a conditional handover is fulfilled as determined by, for example, the wireless device 22 such as via one or more of processing circuitry 84, processor 86, radio interface 82, measurement unit 34, etc. Consequently, the network node 16 may not configure the wireless device 22 with a gap in response. In one or more embodiments, the wireless device 22 such as via one or more of processing circuitry 84, processor 86, radio interface 82, measurement unit 34, etc., may inform the network node 16 about the GNSS measurement trigger. The network node 16 such as via one or more of processing circuitry 68, processor 70, radio interface 62, configuration unit 32, etc. may then respond by configuring the wireless device 22 with a single GNSS measurement gap (i.e., an example of a GNSS measurement gap configuration), defined by one or more of a length and a starting offset. Alternatively, the network node 16 such as via one or more of processing circuitry 68, processor 70, radio interface 62, configuration unit 32, etc., may have preconfigured the wireless device 22 with such a gap to be executed when another event triggers a GNSS measurement. The network node 16 such as via one or more of processing circuitry 68, processor 70, radio interface 62, configuration unit 32, etc., may then take the event trigger into account when scheduling transmissions for this wireless device 22.

In one or more embodiments, when the wireless device 22 such as via one or more of processing circuitry 84, processor 86, radio interface 82, measurement unit 34, etc., is instructed to perform a single GNSS measurement, which may be an RRC command, the configured measurement gaps are activated.

Determination of Measurement Gap Length

The time to obtain a GNSS fix (e.g., time to perform one or more measurements such as for determining a geographical position) can vary. For example, the time to obtain a GNSS fix may depend on prior knowledge of the wireless device 22 and satellite position, which can be facilitated by the network node 16 by, for example, Assisted GNSS (AGNSS) information. In one or more examples, the GNSS fix may also depend on at least one of the number of visible GNSS satellites and the quality of the GNSS receiver. In one or more embodiments, the GNSS measurement, or transmission, gap is configured by the network node 16 such as via one or more of processing circuitry 68, processor 70, radio interface 62, configuration unit 32, etc., based on, e.g., the wireless device 22's support of AGNSS and/or the number of GNSS satellites expected to be visible by a wireless device 22 and/or other factors that are determinable by the network node 16.

In one or more embodiments, by default, the network node 16 such as via one or more of processing circuitry 68, processor 70, radio interface 62, configuration unit 32, etc., may assume that the wireless device 22 during a GNSS measurement gap successfully performs a GNSS measurement and determines the wireless device 22's geographical position. In some instances, the wireless device 22 may however fail to perform the measurement within the configured gap. In one or more embodiments, the wireless device 22 such as via one or more of processing circuitry 84, processor 86, radio interface 82, measurement unit 34, etc., may thus report, to the network node 16, the wireless device 22's failure to obtain a GNSS position. In response, the network node 16 such as via one or more of processing circuitry 68, processor 70, radio interface 62, configuration unit 32, etc., may configure a longer GNSS measurement gap to increase the chance of success for the wireless device 22 to obtain a GNSS position based at least in part on the measurement(s).

In one or more embodiments, to support the determination of a measurement gap length, the wireless device 22 such as via one or more of processing circuitry 84, processor 86, radio interface 82, measurement unit 34, etc., may report its time to perform GNSS measurements when the GNSS measurements are sent so that the network node 16 such as via one or more of processing circuitry 68, processor 70, radio interface 62, configuration unit 32, etc., may adaptively change measurement gap configurations based at least in part on the reported time(s).

The determination of measurement gap length may depend on the number of satellites that the wireless device 22 is expected to measure, which may correspond to the expected precision of the GNSS measurement. The network node 16 such as via one or more of processing circuitry 68, processor 70, radio interface 62, configuration unit 32, etc., may request the wireless device 22 to measure a minimum number of satellites to achieve a certain precision.

Therefore, one or more embodiments described herein advantageously provide for efficient management of GNSS measurements in an NTN such as to helps facilitate time and frequency corrections. In one or more embodiments, the wireless device 22 is able to perform GNSS measurement using the configuration(s) described herein such that GNSS measurement behavior and cellular operation may co-exist while, for example, avoiding having to use a costly duplex filter for simultaneous GNSS and cellular operation.

SOME EXAMPLES

Example A1. A network node 16 configured to communicate with a wireless device 22, the network node 16 configured to, and/or comprising a radio interface 62 and/or comprising processing circuitry 68 configured to:
configure the wireless device 22 to perform the at least one Global Navigation Satellite System, GNSS, measurement during a radio resource control, RRC, state during at least one measurement gap, the configuring of the wireless device 22 including configuring at least one of a measurement trigger, measurement gap length and measurement gap periodicity.

Example A2. The network node 16 of Example A1, wherein the network node 16 and/or radio interface 62 and/or processing circuitry 68 is further configured to receive an indication of the at least one GNSS measurement trigger for performing the at least one GNSS measurement by the wireless device 22 in the RRC state during the at least one measurement gap.

Example A3. The network node 16 of Example A1, wherein the measurement trigger includes at least one of an absolute time and trigger event condition.

Example A4. The network node 16 of Example A1, wherein the network node 16 and/or radio interface 62 and/or processing circuitry 68 is further configured to receive capability information of the wireless device 22 for performing the at least one GNSS measurement, the capability information including at least one of frequency division duplex, FDD, capability, time division duplex, TDD, capability and frequency band capability; and
the configuration of the wireless device 22 being based at least in part on the wireless device capability information.

Example B1. A method implemented in a network node 16 that is configured to communicate with a wireless device 22, the method comprising:
configuring the wireless device 22 to perform the at least one Global Navigation Satellite System, GNSS, measurement during a radio resource control, RRC, state during at least one measurement gap, the configuring of the wireless device 22 including configuring at least one of a measurement trigger, measurement gap length and measurement gap periodicity.

Example B2. The method of Example B1, further comprising receiving an indication of the at least one GNSS measurement trigger for performing at least one GNSS measurement by the wireless device 22 in the RRC state during the at least one measurement gap.

Example B3. The method of Example B1, wherein the measurement trigger includes at least one of an absolute time and trigger event condition.

Example B4. The method of Example B1, further comprising receiving capability information of the wireless device 22 for performing the at least one GNSS measurement, the capability information including at least one of frequency division duplex, FDD, capability, time division duplex, TDD, capability and frequency band capability; and
the configuration of the wireless device 22 being based at least in part on the wireless device capability information.

Example C1. A wireless device 22 configured to communicate with a network node 16, the WD 22 configured to, and/or comprising a radio interface and/or processing circuitry 84 configured to:
receive an indication of a configuration for performing at least one Global Navigation Satellite System, GNSS, measurement during a radio resource control, RRC, state during at least one measurement gap, the configuring of the wireless device 22 including configuring at least one of a measurement trigger, measurement gap length and measurement gap periodicity; and
perform the at least one GNSS measurement based at least in part on the configuration for performing the at least one GNSS measurement.

Example C2. The wireless device 22 of Example C1, wherein the wireless device 22 and/or radio interface 62 and/or processing circuitry 68 is further configured to transmit an indication of the at least one GNSS measurement trigger for performing the at least one GNSS measurement by the wireless device 22 in the RRC state during the at least one measurement gap.

Example C3. The wireless device 22 of Example C1, wherein the measurement trigger includes at least one of an absolute time and trigger event condition.

Example C4. The wireless device 22 of Example C1, wherein the wireless device 22 and/or radio interface 62 and/or processing circuitry 68 is further configured to transmit capability information of the wireless device 22 for performing the at least one GNSS measurement, the capability information including at least one of frequency division duplex, FDD, capability, time division duplex, TDD, capability and frequency band capability; and the configuration for performing the at least one GNSS measurement being based at least in part on the wireless device capability information.

Example D1. A method implemented in a wireless device 22 that is configured to communicate with a network node 16, the method comprising:

receiving an indication of a configuration for performing at least one Global Navigation Satellite System, GNSS, measurement during a radio resource control, RRC, state during at least one measurement gap, the configuring of the wireless device 22 including configuring at least one of a measurement trigger, measurement gap length and measurement gap periodicity; and performing the at least one GNSS measurement based at least in part on the configuration for performing the at least one GNSS measurement.

Example D2. The method of Example D1, further comprising transmitting an indication of the at least one GNSS measurement trigger for performing at least one GNSS measurement by the wireless device 22 in the RRC state during the at least one measurement gap.

Example D3. The method of Example D1, wherein the measurement trigger includes at least one of an absolute time and trigger event condition.

Example D4. The method of Example D1, further comprising transmitting capability information of the wireless device 22 for performing the at least one GNSS measurement, the capability information including at least one of frequency division duplex, FDD, capability, time division duplex, TDD, capability and frequency band capability; and the configuration for performing the at least one GNSS measurement being based at least in part on the wireless device capability information.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for communicating with a wireless device, the network node comprising:
processing circuitry configured to:
receive measurement capability information of a wireless device, the measurement capability information indicating an ability to perform a global navigation satellite system (GNSS) measurement;
determine a GNSS measurement gap configuration during which the wireless device is to perform at least one GNSS measurement during at least one GNSS measurement gap, the GNSS measurement gap configuration being based at least in part on the received measurement capability information;
indicate the GNSS measurement gap configuration to the wireless device;
receive a report indicating a time for the wireless device to perform the at least one GNSS measurement; and
change a GNSS measurement gap configuration of the wireless device based at least on the report.

2. The network node of claim 1, wherein the GNSS measurement gap configuration configures the wireless device that is in a radio resource control (RRC) connected state with at least one transmission gap during which a GNSS measurement is to be performed.

3. The network node of claim 2, wherein the at least one transmission gap is configured based on a scheduled transmission of the wireless device exceeding a predefined time length.

4. The network node of claim 1, wherein the at least one GNSS measurement gap is associated with at least one of a trigger, gap length, periodicity and offset.

5. The network node of claim 4, wherein the trigger is based on a predefined event and corresponds to one of a predefined instruction transmitted by the network node and predefined condition being satisfied.

6. The network node of claim 5, wherein the predefined event is a handover event.

7. The network node of claim 5, wherein the predefined instruction is a handover command; and
the predefined condition is a handover of the wireless device.

8. The network node of claim 1, wherein the processing circuitry is further configured to determine a time length of a GNSS measurement gap of the at least one GNSS measurement gap based on at least one of a number of GNSS satellites, a quality of a GNSS receiver at the wireless device and an indicated failure to receive a GNSS position.

9. The network node of claim 8, wherein the number of GNSS satellites corresponds to a minimum number of GNSS satellites to achieve a predefined precision of GNSS measurement.

10. The network node of claim 1, wherein the network node does not schedule the wireless device to at least one of receive and transmit via a cellular radio interface during the at least one GNSS measurement gap.

11. The network node of claim 1, wherein the at least one GNSS measurement is configured to allow the wireless device to acquire location information for correcting at least one of time and frequency references used for cellular radio communication.

12. A wireless device for communicating with a network node, the wireless device comprising:
processing circuitry configured to:
transmit measurement capability information indicating an ability to perform a global navigation satellite system (GNSS) measurement;
receive an indication of a GNSS measurement gap configuration during which the wireless device is to perform at least one GNSS measurement during at least one GNSS measurement gap, the GNSS measurement gap configuration being based at least in part on the received measurement capability information;
perform the at least one GNSS measurement,
transmit a report indicating a time for the wireless device to perform the at least one GNSS measurement; and
receive an indication of a change in the GNSS measurement gap configuration of the wireless device based at least on the report.

13. The wireless device of claim 12, wherein the GNSS measurement gap configuration configures the wireless device that is in a radio resource control (RRC) connected state with at least one transmission gap during which a GNSS measurement is configured to be performed.

14. The wireless device of claim 13, wherein the at least one transmission gap is configured based on a scheduled transmission of the wireless device exceeding a predefined time length.

15. The wireless device of claim 12, wherein the at least one GNSS measurement gap is associated with at least one of a trigger, gap length, periodicity and offset.

16. The wireless device of claim 15, wherein the trigger is based on a predefined event and corresponds to one of a predefined instruction transmitted by the network node and predefined condition being satisfied.

17. The wireless device of claim 16, wherein the predefined event is a handover event.

18. The wireless device of claim 16, wherein the predefined instruction is a handover command; and
the predefined condition is a handover of the wireless device.

19. The wireless device of claim 12, wherein a time length of a GNSS measurement gap of the at least one GNSS measurement gap is based on at least one of a number of GNSS satellites, a quality of a GNSS receiver at the wireless device and an indicated failure to receive a GNSS position.

20. The wireless device of claim 19, wherein the number of GNSS satellites corresponds to a minimum number of GNSS satellites to achieve a predefined precision of GNSS measurement.

21. The wireless device of claim 12, wherein the wireless device is not required to at least one of receive and transmit via a cellular radio interface during the at least one GNSS measurement gap.

22. The wireless device of claim 12, wherein the processing circuitry is further configured to acquire location information for correcting at least one of time and frequency references used for cellular radiocommunication using the at least one GNSS measurement.

* * * * *